March 24, 1959     J. R. WIRT     2,878,552
LAMINATED ARTICLE AND METHOD OF MANUFACTURE
Filed Feb. 9, 1954

INVENTOR.
JOHN R. WIRT
BY
HIS ATTORNEY

2,878,552

LAMINATED ARTICLE AND METHOD OF MANUFACTURE

John R. Wirt, Anderson, Ind., assignor to General Motors Corporation, Detroit, Mich., a corporation of Delaware Application February 9, 1954, Serial No. 409,124

2 Claims. (Cl. 29—180)

This invention relates to a method of assembly of a laminated article and to the article formed thereby.

An object of the present invention is to form a laminated article of at least three layers wherein the parts are assembled so that they will be in proper alignment with each other and so that the middle part will be held in proper relative position to the outer parts when portions of the outer layers are welded together.

A further object of the present invention is to form the outer parts of a laminated article so that parts forming intermediate layers will be aligned with and held in position relative to the outer layers when selected surface portions of the outer layers are welded together.

A more specific object of the present invention is to provide the parts forming the inner layers of a laminated article with apertures and at least one of the parts forming an outer layer of said laminated article with projections, so that the projections will pass through said apertures and thereby hold the inner layers in proper position when the projections of said one outer layer are welded to surface portions of the other outer layer.

It is another object of the present invention to provide a method for assemblying laminated parts of an armature for a voltage regulator that includes the formation of a projection on at least one of the parts that will be in contact with portions of each of the other parts to be laminated therewith so that the parts will be correctly positioned and joined to each other when the projection is welded to a portion of another part which it contacts.

Further objects and advantages of the present invention will be apparent from the following description, reference being had to the accompanying drawings wherein a preferred embodiment of the present invention is clearly shown.

In the drawing:

Figure 1 is a view of an armature of a relay that is assembled according to the present invention.

Figure 2 in perspective shows the separate parts that form a relay armature.

Figure 1:
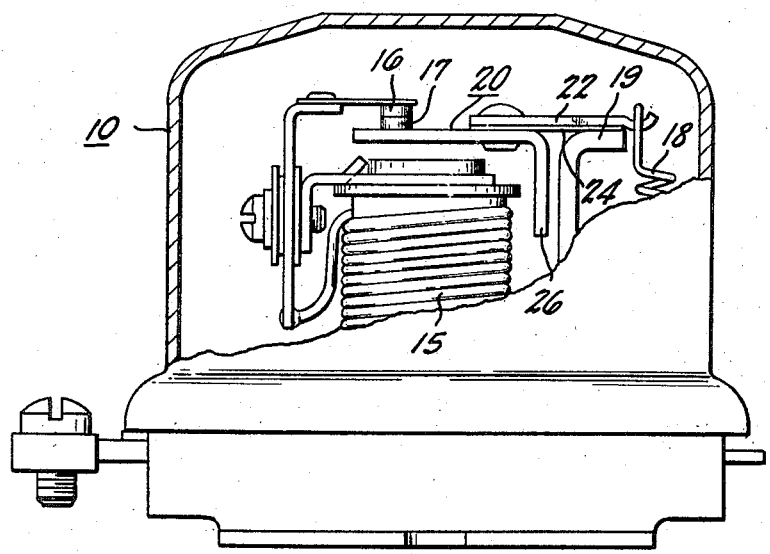

In Figure 1 of the drawing a relay 10 is shown which has an electromagnetic coil 15 that attracts a movable armature 20 when the windings of coil 15 are suitably excited from an external source of current, not shown, so that the electrical connection between contacts 16 and 17 is made or broken (as desired) when the armature 20 is moved against the force of spring 18 about support 19.

The armature 20 is formed of a plurality of parts which includes the metallic spring plate 22, the hinge portion 24, which may be formed of stainless or spring steel or other suitable metallic or bimetallic materials, and the armature plate 26 which carries the movable metallic contact 17.

Figure 2:
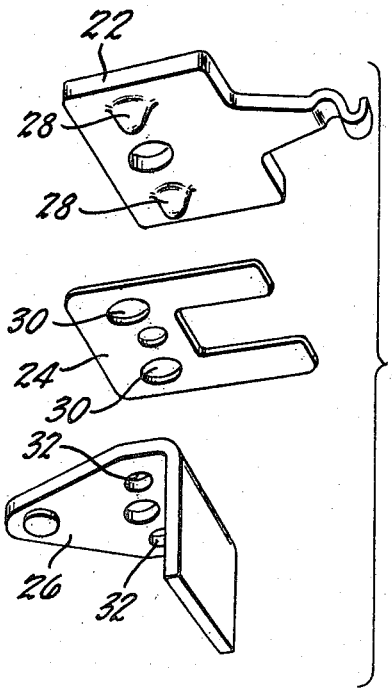
Figure 3:
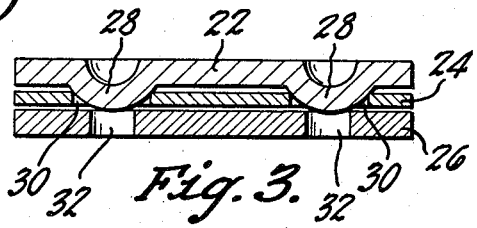
Figure 3 shows one method of laminating the parts in Figure 2.

The parts of the armature 20 shown in Figure 2, are assembled by superimposing one part upon another as clearly shown in Figure 3. To aid in accomplishing this assembly operation and to maintain the parts in alignment relative to each other, plate 22 has a pair of suitably located projections 28 formed thereon. These projections which may be formed in any suitable manner such as by punching etc. are arranged to pass through the suitably located apertures 30 in the bimetallic element 24 and extended to be in contact with the material which surrounds apertures 32 formed in contact part 26 as shown in Fig. 3. When the parts are in position as shown in Figure 3 they may be welded together by any well known welding method such as ring resistance welding.

From the above arrangement of parts, it is apparent that the bimetallic hinge portion 24 need not be welded to the parts 22 and 26 during the welding operation, as portion 24 is securely held in clamped position by the projections 28 when the parts 22 and 26 are secured to each other. Manifestly the center bimetallic element 30 may be welded to the other members if desired, but the present method of assembly comprehends an economical method of welding for laminating parts together, the center element 24 either is of a nonmetallic material or of a material which would be deleteriously effected by the welding temperatures normally employed.

Figure 4:
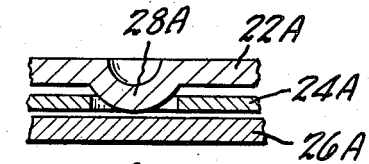
Figure 4 shows another method of laminating the parts shown in Figure 2.
Figure 5:
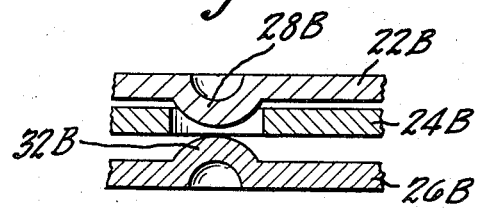
Figure 5 shows a third method of the laminating of the parts in Figure 2.

As is clearly apparent in Figure 4, part 26A may be formed without an aperture so that the projection on part 22A may be welded to a surface of part 26A to hold part 24A in position as set forth in the embodiment described in Figure 3. Further the parts may be laminated and positioned on each other by the use of more than one projection as in Figure 5 wherein the projection 32B replaces the aperture 32 in Figure 3. In this embodiment the projection 32B contacts the projection 28B on part 22B when the parts are laminated one upon another. In Figure 4 the part 26A is formed without an aperture and is positioned in a welding fixture relative to the parts 22A and 24A during the welding to align the parts during welding.

It is clearly apparent that the present method is particularly suitable to applications wherein at least three parts are to be assembled and aligned with each other. The present method makes possible the elimination of a welding fixture that is normally required to position the parts prior to welding. This is accomplished by the use of properly located projections and apertures in the parts to be laminated.

While the embodiment of the present invention as herein disclosed, constitutes a preferred form, it is to be understood that other forms might be adopted.

What is claimed is as follows:

1. A laminated article for use as a spring hinge for a relay and the like comprising, a first sheet metal member having a plurality of integral projections extending therefrom which are small in area as compared to the area of said member, a second sheet metal member welded to the projections only of said first sheet metal member and spaced therefrom a distance corresponding substantially to the length of said projections, a third sheet metal member interposed between said first and second sheet metal members and having openings of a diameter corresponding substantially to the diameter of said projections receiving said projections for holding said third sheet metal member in a predetermined fixed position with respect to said first and second sheet metal members, the mating relationship between said projections and said openings constituting the sole means for preventing sliding of said third sheet metal member with respect to said first and second sheet metal members.

2. In a method for assembling a laminated article the steps comprising: providing a first sheet metal part having a plurality of projections extending from one side thereof, the areas of which are small as compared to the total area of the member, providing a second sheet metal member having a plurality of openings aligned with the projections on said first sheet metal member, said openings having a diameter substantially equal to the diameter of said projections, placing said first and second sheet metal members in such a position that said projections are received in said openings, placing a third sheet metal member in a position to contact the ends only of said projections, and then welding the ends of the projections only of said first sheet metal member to said third sheet metal member.

References Cited in the file of this patent
UNITED STATES PATENTS

| | | |
|---|---|---|
| 555,131 | Thomson | Feb. 25, 1896 |
| 828,033 | Lachman | Aug. 7, 1906 |
| 1,020,991 | Lachman | Mar. 26, 1912 |
| 1,082,767 | Rietzel | Dec. 30, 1913 |
| 1,190,208 | Williams | July 4, 1916 |
| 2,143,097 | Warnke | Jan. 10, 1939 |
| 2,326,806 | Shmuark | Aug. 17, 1943 |
| 2,327,924 | Mounts | Aug. 24, 1943 |
| 2,484,093 | Huetten | Oct. 11, 1949 |
| 2,497,547 | Hastings | Feb. 14, 1950 |
| 2,671,951 | Sliwiak | Mar. 16, 1954 |